United States Patent [19]
Goans et al.

[11] Patent Number: 5,346,329
[45] Date of Patent: Sep. 13, 1994

[54] FLOATING BARRIER METHOD AND APPARATUS

[75] Inventors: Kip B. Goans; Richard J. Lazes, both of Harvey, La.

[73] Assignee: Oil Stop, Inc., New Orleans, La.

[21] Appl. No.: 19,863

[22] Filed: Feb. 19, 1993

Related U.S. Application Data

[63] Continuation-in-part of Ser. No. 19,030, Feb. 18, 1993, which is a continuation-in-part of Ser. No. 933,721, Aug. 24, 1992, which is a continuation-in-part of Ser. No. 752,002, Aug. 29, 1991, Pat. No. 5,195,844, which is a continuation of Ser. No. 638,704, Jan. 8, 1991, abandoned, which is a continuation of Ser. No. 424,158, Oct. 19, 1989, Pat. No. 5,022,785.

[51] Int. Cl.$^5$ .............................................. E02B 15/04
[52] U.S. Cl. ...................................... 405/68; 405/60; 405/63
[58] Field of Search ...................... 405/63-72, 405/60; 210/DIG. 23, 242.3

[56] References Cited

U.S. PATENT DOCUMENTS

| | | | |
|---|---|---|---|
| 3,563,036 | 2/1971 | Smith et al. | 405/69 |
| 3,592,006 | 7/1971 | Crocet | 405/66 |
| 3,608,316 | 9/1971 | Manuel | 405/68 |
| 3,703,811 | 11/1972 | Smith | 405/68 |
| 3,792,589 | 2/1974 | Sayles | 405/68 |
| 3,922,861 | 12/1975 | Gvihangne | 405/68 X |
| 4,124,981 | 11/1978 | Preus | 405/66 |

Primary Examiner—Dennis L. Taylor
Attorney, Agent, or Firm—George A. Bode

[57] ABSTRACT

A float boom for retaining a floatable material, such as hydrocarbons, floating upon a liquid surface. This float boom consists of separate and sequentially arranged buoyancy chambers having depending channels that are interconnected via a passageway such that an inflating medium is sequentially supplied to the buoyancy chambers. An automatic sealing system blocks access to each buoyancy chamber by closing the depending channel whenever the internal pressure within the channel is less than the external pressure upon the channel.

22 Claims, 5 Drawing Sheets

FLOATING BARRIER METHOD AND APPARATUS

This application is a continuation-in-part application of a previous application by the same inventor executed Jan. 15, 1993, and bearing U.S. Ser. No. 08/019,030 filed Feb. 18, 1993, which is a continuation-in-part application of U.S. Ser. No. 07/933,721 filed Aug. 24, 1992, which is a continuation-in-part application of U.S. Ser. No. 07/752,002 filed Aug. 29, 1991, which is a continuation application of U.S. Ser. No. 07/638,704 (now abandoned) filed Jan. 8, 1991, which is a continuation of U.S. Ser. No. 07/424,158 filed Oct. 19, 1989, now U.S. Pat. No. 5,022,785, issued Jun. 11, 1991.

This application is a continuation-in-part application of a previous application by the same inventor executed Jan. 15, 1993, and bearing U.S. Ser. No. filed Feb. 18, 1993, which is a continuation-in-part application of U.S. Ser. No. 07/933,721 filed Aug. 24, 1992, which is a continuation-in-part application of U.S. Ser. No. 07/752,002 filed Aug. 29, 1991, which is a continuation application of U.S. Ser. No. 07/638,704 (now abandoned) filed Jan. 8, 1991, which is a continuation of U.S. Ser. No. 07/424,158 filed Oct. 19, 1989, now U.S. Pat. No. 5,022,785, issued Jun. 11, 1991.

BACKGROUND OF THE INVENTION

1. Field of the Invention

This invention pertains to a floating boom or barrier for collecting and restraining floatable material, such as liquid hydrocarbons, floating on the surface of a body of water, and more particularly to a segmented, inflatable boom incorporating check valves that automatically close to prevent the unwanted or unintended release of the inflating medium.

2. General Background

Conventional floating oil booms or barriers normally comprise an elongated tubular body that is produced by the inflation of a sealed tube to which the oil-confining skirt is attached. These booms or barriers are normally stored on land or on a ship in a collapsed deflated state, either by folding it flat or by rolling it upon a reel. See, for example, U.S. Pat. Nos. 2,682,151 and 3,494,132 which disclose a series of inflatable plastic tubes whose ends are interconnected by sleeves. Secured to each tube is a depending hollow skirt or fin having a weighted material (for ballast), such as lead shot or chain or sand or gravel, contained in or attached to the lower longitudinal edge of the fin.

Other patents, such as U.S. Pat. No. 4,123,911, disclose a continuous inflatable tube one end of which is affixed to the deployment vessel. This deployment vessel supplies the tube with pressurized air or the like so as to inflate the tube in order to achieve the required degree of buoyancy necessary to float the boom. The opposite end of the tube, after it is fully deployed from the transport vessel, is then attached to either a second vessel or to a drogue or to some other means of securing this second end at sea.

U.S. Pat. No. 4,325,653 illustrates a collapsible boom which, in its inflated condition, incorporates double buoyancy chambers disposed on opposite sides of a central skirt. A tension wire is secured to the lower region of the skirt while two separate pressure hoses are secured to the upper region of the skirt above the buoyancy chambers. Inflation air is supplied to the buoyancy chambers through the pressure hoses with the preferable arrangement being to utilize a separate pressure hose for each buoyancy chamber. This inflation air is supplied to the pressure hoses from an external source via a rotary gland fitted at the reel core axis.

Each of the aforementioned patents has the disadvantage that should a leak develop or occur in the inflatable tube, such leak could seriously disrupt the buoyancy of the entire boom, thereby possibly rendering it non-functional.

An attempt to overcome this deficiency is illustrated in U.S. Pat. No. 3,792,589 which shows a collapsible boom that incorporates a plurality of individual inflatable compartments. However, each of these compartments must be separately inflated through separate valves as the boom is unrolled from the deploying vessel. This, obviously, greatly increases the time required to deploy the boom which becomes significant when a vast area is to be contained.

Thus, the above patents fail to disclose a rapidly deployable retaining boom and especially one which can withstand leaks or ruptures should they occur. Consequently, it is an object of this invention to provide a boom that incorporates separate, longitudinally spaced inflatable compartments that can be rapidly inflated.

Another object of this invention is to provide a boom which can withstand leaks or ruptures in individual compartments without compromising the function of adjacent compartments or the entire boom.

Yet another object of this invention is to provide a reelable collapsible boom that is not bulky when stored and will not lose its expansion capabilities when stored for long periods of time.

Still another object of this invention is to provide an elongated inflatable boom that can be coupled to other such elongated inflatable booms, thereby providing a means to cordon off or surround a given area.

Yet another object of this invention is to provide a boom that need be inflated only from a single end and which can be inflated either before or after deployment into the water.

Still another object of this invention is to provide a boom that does not rely upon mechanical valves to isolate or inflate the various separate inflatable compartments.

Furthermore, an object of this invention is to provide a means for automatically inflating and deflating the separate compartments of the boom as needed.

Additionally, it is an object of this invention to provide a boom that, because of it being so inexpensive, need not be cleaned after each use for subsequent re-use, but instead can be discarded if so desired, thereby eliminating such cleaning and repair costs.

Still another object of the invention is to provide a boom that can be employed to contain oil spilled on water that has been ignited and is burning. To burn oil safely, it must be contained by booms which are capable of withstanding high temperatures. The invention can be employed as a fire boom by covering its exterior surface with an insulating material and then pumping cool air or liquid through the inflation chamber to keep the interior of the boom cool.

These and other objects and advantages of this invention will become obvious upon further investigation.

SUMMARY OF THE PRESENT INVENTION

The preferred embodiment of the apparatus of the present invention solves the aforementioned problems in a straightforward and simple manner.

What is disclosed is a flexible inflatable float boom for confining a material floatable on a liquid surface. This invention incorporates a plurality of sealed inflatable buoyancy chambers having impervious channel means depending or extending downwardly therefrom for providing access to the buoyancy chambers. A passageway is coupled between a lower end region of the channel means of one such buoyancy chamber and a lower end region of the channel means of an adjacent buoyancy chamber. This passageway and the channel means are constructed and arranged for the passage of an inflating medium therethrough into the buoyancy chambers. Ballast means are secured to the float boom underneath the buoyancy chambers for maintaining the boom in the proper orientation when deployed. Additionally, means are supplied for automatically blocking access to a buoyancy chamber whenever the internal pressure within its respective channel means is less than the external hydrostatic pressure acting upon the channel means.

It is common practice in responding to oil spills to employ towable storage bladders and/or barges. These structures are employed to store recovered oil that is removed from an oil spill. They can also be used to transport other fluids through the water.

It is desirable for these bladders or barges to have sectionalized flotation chambers so that in the event that one or more of them is damaged, the entire structure doesn't sink. The present invention can be used to make it possible to inflate multiple inflation chambers from a single air source while still have these chamber protected from deflating if one or several are punctured. This is particularly desirable as these storage bladders are normally stored on oil tankers or oil response vessels in their deflated condition to economize on space. In the event that they are needed to store oil collected from an oil spill, it is desirable to deploy them in the water and to simultaneously inflate them. It is difficult and provides a safety hazard to put men out in small boats to open and shut conventional valves that isolate the individual buoyancy chambers. With the aid of this invention and a hose connected to one of these inflation chambers, the individual sections can be inflated from a single air source.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
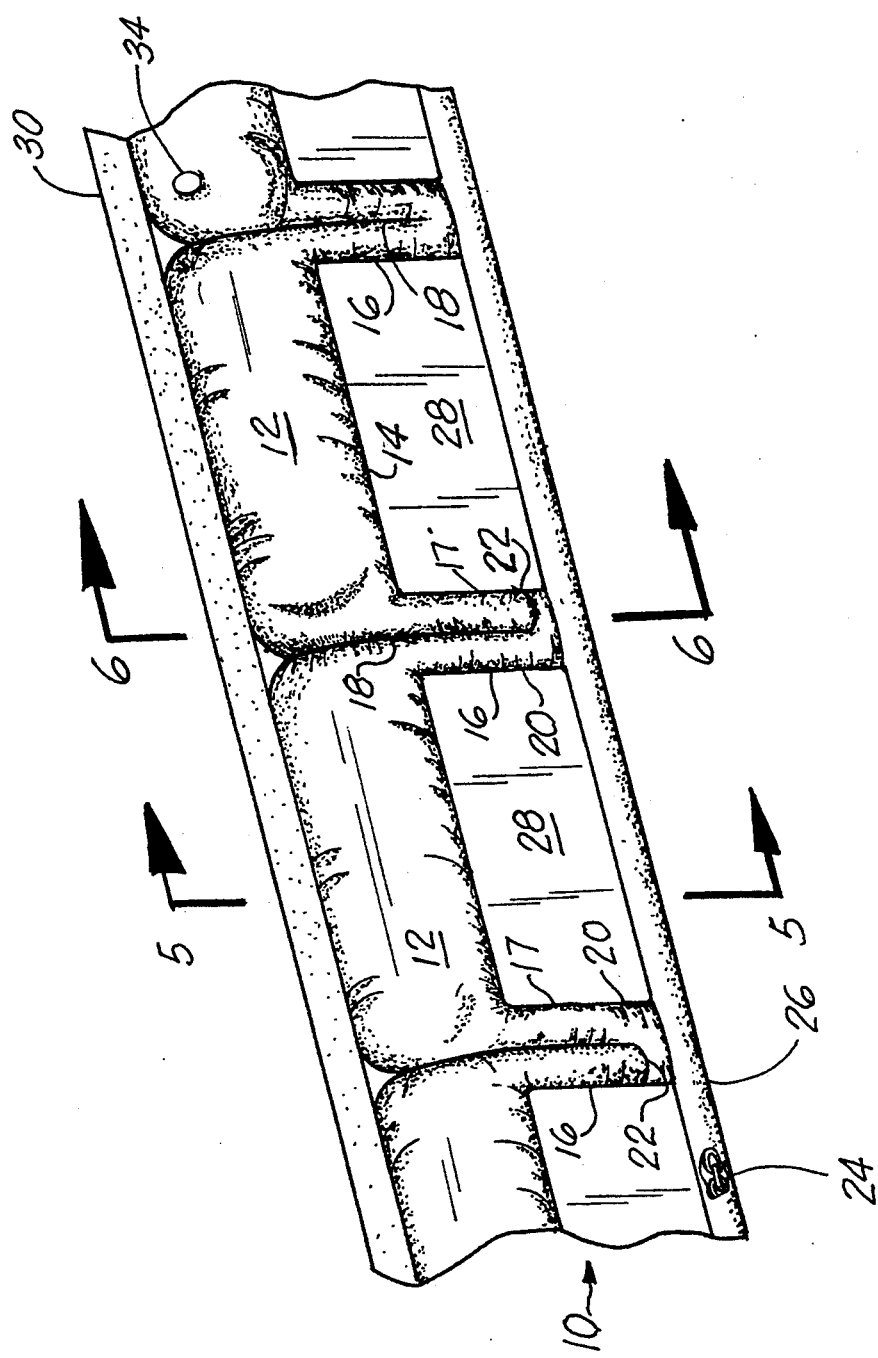
FIG. 1 is a pictorial view, partially broken away, of the preferred embodiment of the apparatus of the present invention.
Figure 2:
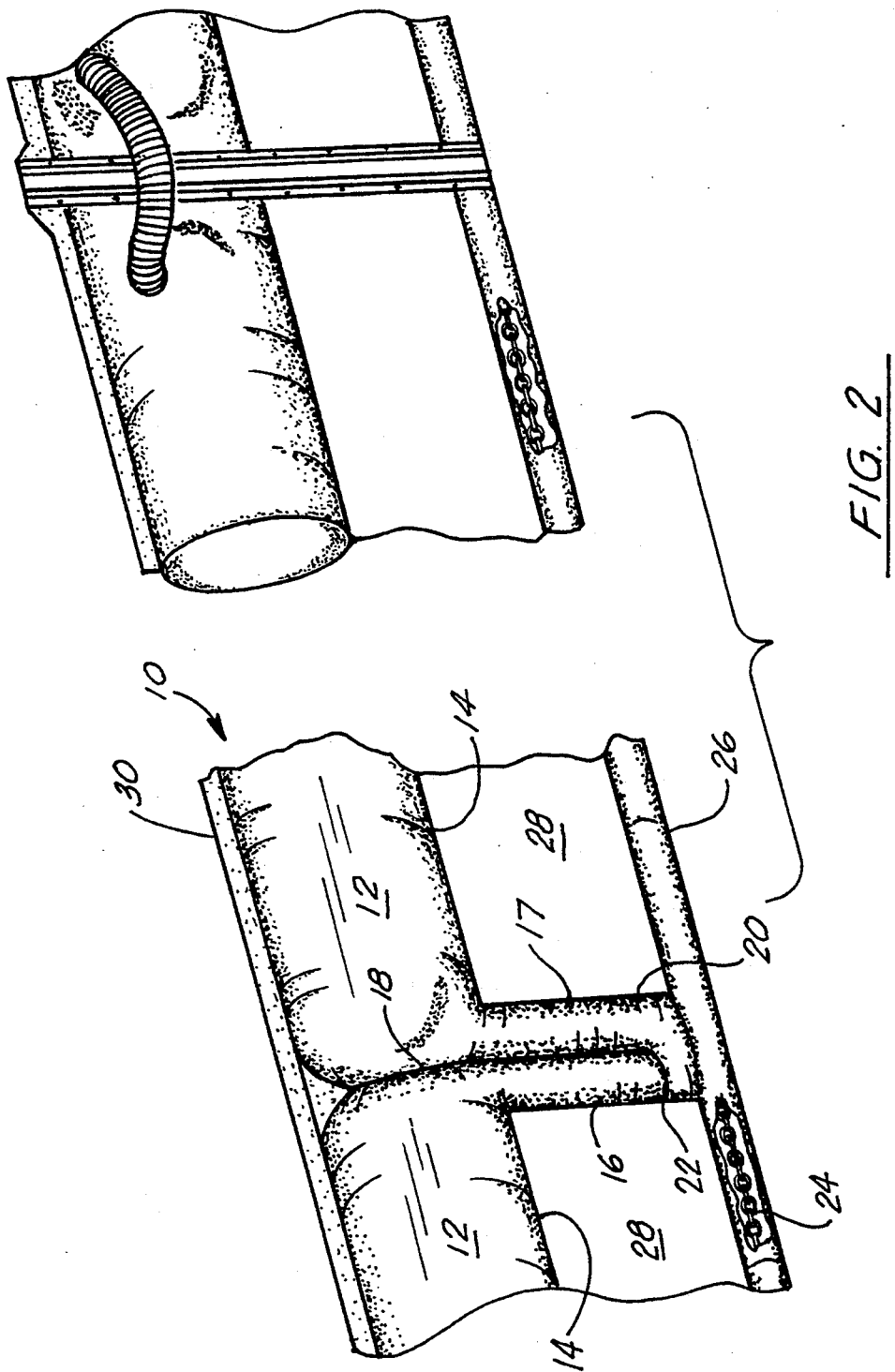
FIG. 2 is a pictorial view, partially broken away, of the interconnecting passageway between adjacent chambers of the preferred embodiment of the apparatus of the present invention.

Referring initially to FIG. 1, there is shown floating boom or barrier 10 that is constructed of a fluid impervious material, such as a plastic coated nylon or the like. Since boom 10 is used in an open environment, it must also be constructed of weather and UV resistant material as well. When deployed in the water, the fluid impervious material of boom 10 will prevent any further spreading of the substance to be contained, such as hydrocarbons floating on the surface of the water.

Boom or barrier 10 consists of a series of separate elongated buoyancy compartments or chambers 12 that are secured together in a linear fashion, thereby defining a first buoyancy chamber, a last buoyancy chamber and intermediate buoyancy chambers. Generally the number of such chambers 12 per boom 10 is approximately 5 to 10, however, more or fewer such chambers 12 may be employed depending upon the length of boom 10 desired and the length of the individual buoyancy chambers 12. Additionally, multiple booms 10 may be interconnected thereby creating a single continuous barrier of any desirable length.

Each separate buoyancy chamber 12 of boom 10 is inflated by an appropriate fluid, such as pressurized air, that is supplied by the deployment vessel (not shown). Ideally, this pressurized air would be injected into boom 10 as it is being unrolled from the deployment vessel, thereby enabling boom 10 to float in the water while being so deployed.

In the embodiment disclosed in the drawings, buoyancy chambers 12 are configured with an upper (when inflated) elongated bladder 14 having a downwardly extending or depending entry channel 16 at one end of bladder 14 and a similar downwardly extending or depending exit channel 17 at the opposite end thereof. These channels 16 and 17 are preferably constructed of a flexible impervious material that during use may be inflated and which during non-use may be collapsed. An impervious wall, seal or barrier 18 separates the adjacent bladders 14 and adjacent depending channels 16 and 17 of these adjacent bladders 14. However, at the bottom or lower end region 20 of each depending channel union 16 and 17 is passageway 22 which connects the lower end region 20 of exit channel 17 to the corresponding lower end region 20 of the adjacent entry channel 16. In this fashion, the fluid which inflates buoyancy chamber 12 can pass from one such chamber to the next or adjacent one, thereby providing a means of supplying the inflating medium (i.e. pressurized air) to each chamber 12 of boom 10 in succession. Additionally, this manner of interconnecting the various chambers 12 aids in equalizing the pressure along boom 10 during use.

Submerged underneath each buoyancy chamber 12, and running along the length of boom 10, is ballast or weighted mass 24. In the embodiment shown, ballast 24 consists of a chain or cable passing through bottommost sleeve 26. However, other types of ballast 24 (i.e., sand, gravel, lead shot) can be accommodated whether they extend through sleeve 26 or not. The main purpose of ballast 24 is to properly orient boom 10 while in the floating position. Ballast 24 also serves to provide tensile strength to boom 10 such that boom 10 is not ripped or pulled apart during deployment, use, or otherwise. Generally, the amount of tensile strength provided by ballast 24 can range from 5 pounds up to and exceeding 50,000 pounds depending upon the amount and size of ballast 24 provided.

While bottommost sleeve 26 is shown as being located near lower end region 20 of depending channels 16 and 17, as well as passageway 22, there is no connecting conduit between the two. Instead, bottommost sleeve 26, while secured to boom 10, is sealed or separated from any part of buoyancy chamber 12. Thus, no inflating medium is allowed to infiltrate into bottommost sleeve 26 from buoyancy chamber 12 which may have a deleterious affect upon the function and buoyancy of boom 10.

It should be noted that the weight of ballast 24 must be designed so that it does not submerge buoyancy chamber 12 when inflated, thereby reducing the effectiveness of boom 10. Generally, the amount of weight provided by ballast 24 varies from 1 to 4 pounds per linear foot of boom 10, more or less, with the freeboard of boom 10 varying from 8 inches to about 24 inches. Additionally, the weight of ballast 24 must be great enough so that it is capable of retaining boom 10 in the proper orientation and so that it can prevent boom 10 from twisting or becoming tangled due to wind or wave action. For this purpose, bottommost sleeve 26 is used to retain ballast 24 in place and to provide a continuous manner of securing ballast 24 to boom 10.

From the resultant configuration of boom 10 (i.e. inflated buoyancy chamber 12 extending above the water line with ballast 24 and bottommost sleeve 26 located below the water line), depending channels 16 and 17 and the resulting hydrostatic pressure acting thereupon will function as "automatic check valves." Since channels 16 and 17 are constructed of a flexible material, whenever the pressure outside channel 16 or 17 is greater than the pressure within channel 16 or 17, these channels will be biased closed or collapse, thereby blocking or preventing the passage of the inflating medium through passageway 22 from one buoyancy chamber 12 to the next or adjacent chamber 12. However, should the pressure within channel 16 or 17 be greater than the pressure outside channel 16 or 17, the inflating medium will be permitted to pass therethrough sequentially from one buoyancy chamber 12 to the next or adjacent chamber 12. Such an arrangement or check valve assembly will prevent the escape of the inflating medium from a buoyancy chamber 12 in the event of a rupture or the like in boom 10.

For example, should one buoyancy chamber 12 come open or otherwise lose its inflating medium, the inflating medium in the adjacent buoyancy chambers 12 will be prevented from also escaping due to this "automatic check valve" function. This is because before the inflating medium in adjacent chambers 12 can escape, it would have to travel downwardly through depending channel 16 and/or 17, and the hydrostatic pressure acting upon such channel 16 and/or 17 would have to be overcome before such inflating medium would be permitted to pass through passageway 22 into the ruptured adjacent buoyancy chamber 12. Thus, once the pressure within any inflated buoyancy chamber 12 becomes less than the hydrostatic pressure acting upon the lower end region 20 of depending channel 16 and/or 17, no further inflating medium is allowed to pass through passageway 22, thereby automatically retaining such inflating medium within the non-ruptured buoyancy chamber 12.

Of course, the downward extension or length of channels 16 and 17 can vary during the manufacture of boom 10 with this distance also being a function of the weight of ballast 24. Consequently, in choppy seas, such as found in the open ocean, the downward extension of depending channels 16 and 17 must be longer than is needed for relatively calmer water such as found in rivers and/or lakes. Generally, the overall draft of boom 10 can vary from 10 inches to 24 inches, more or less, as desired.

Intermediate upper buoyancy chambers 12 and lower ballast 24 are continuous skirts or panels 28. Panels 28 are also constructed of fluid impervious material such that the substance being retained by boom 10 is prevented from passing through boom 10 as well as underneath buoyancy chamber 12. Generally, panels 28 are constructed of the same material as chamber 12 for ease of manufacturing.

Atop buoyancy chamber 12, and running the length of boom 10, is containment or splash flap 30. This flap 30 aids in the retention within boom 10 of the floating substance that is being contained or encircled by boom 10. Its function is to prevent any wave action (or splashing) from allowing or permitting this contained floating substance to spill or cascade over the top of boom 10. It provides one more barrier that helps in preventing the release of the contained substance into the open sea or other body of water. Ideally, flap 30 would be constructed of the same material as boom 10 and it would be continuously secured atop buoyancy chamber 12. Of course, due to its construction, flap 30 is free to sway or move depending upon the forces acting upon it. In some instances however, flap 30 may incorporate some sort of interior stiffening means that would enable it to remain rigid or semi-rigid under loads.

The various seams of boom 10 would preferably be heat sealed so as to reduce manufacturing costs and to provide a continuous, fluid impervious seal where needed. Other methods of construction may include gluing, stitching, or the like (or some combination thereof). In any event, the various seams of boom 10 would be constructed so as to act as a barrier or containment means for the inflating medium within boom 10. Generally, the pressure differential existing within an inflated buoyancy chamber 12 is about 0.5 psi, more or less, with the burst pressure of the material from which boom 10 is constructed generally requiring a pressure differential of about 6 psi, more or less.

Figure 3:
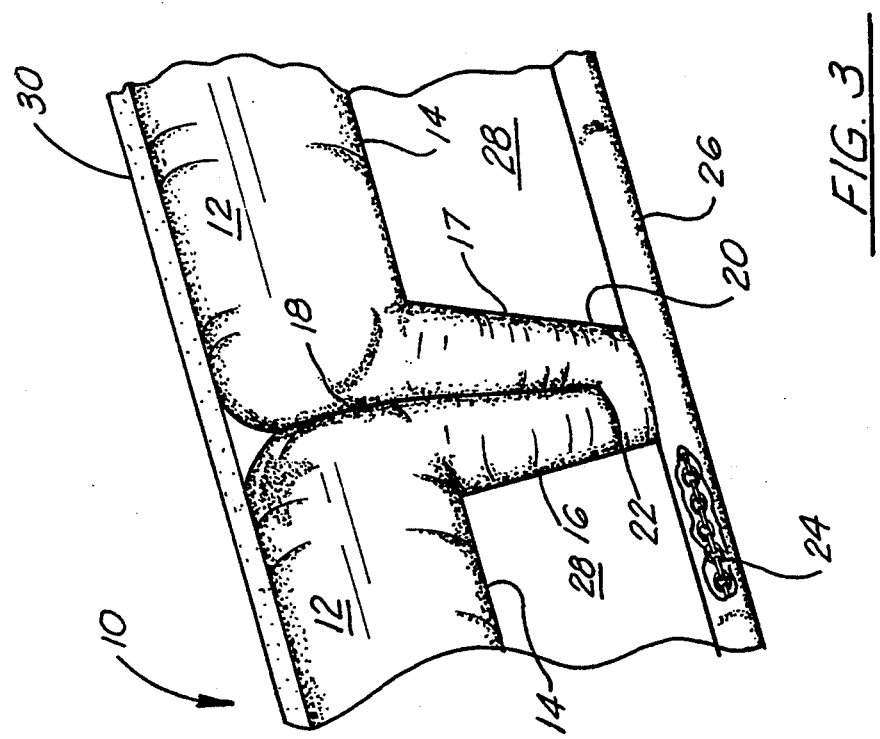
FIG. 3 is a pictorial view, partially broken . away, of an alternate embodiment of the interconnecting passageway between adjacent chambers of the present invention.

One of many alternate embodiments of boom 10 is shown in FIG. 3. In this embodiment, depending channels 16 and 17 are tapered or become narrow as they progress towards passageway 22. Such tapering or narrowing aids in providing additional restriction to the flow of the inflating medium between adjacent buoyancy chambers 12. This additional restriction is useful when boom 10 is inflated since it is not desirable to permit a greater amount of inflating medium to collect in one region of boom 10 at the expense of other regions of boom 10. In other words, by increasingly restricting the flow of the inflating medium between adjacent buoyancy chambers 12, such inflating medium will be more evenly distributed throughout boom 10, thereby providing a more consistent and even barrier to the contained substance. Other variations of depending channels 16 and 17 also exist in addition to those shown in FIGS. 1 and 3.

Figure 4:
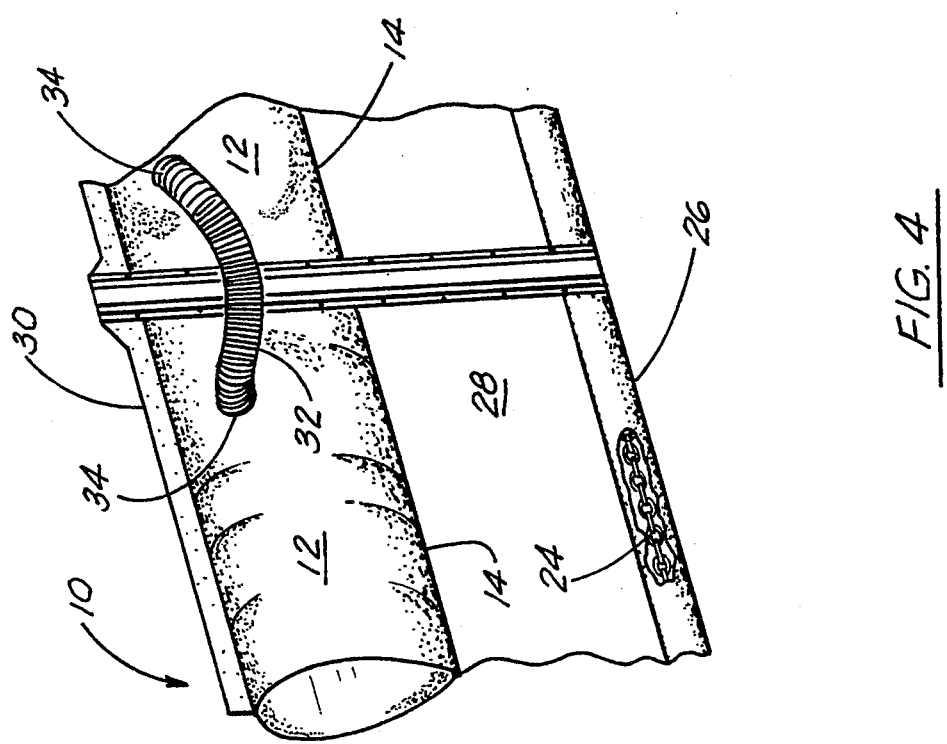
FIG. 4 is a pictorial view, partially broken away, of the interconnection between separate boom lengths of the embodiments of FIG. 1 or FIG. 3 such that more than one boom may be secured together to form as long a boom as needed.

FIG. 4 illustrates a first buoyancy chamber 12 of one boom 10 being secured to a last buoyancy chamber of an adjacent boom 10. The inflating medium is transferred from one such boom 10 to the other boom 10 via hose 32 such that it is now possible to inflate the interconnected booms 10 from a single source rather than requiring each separate boom 10 to be inflated separately. Hose 32 is secured between inflation valves 34 secured to adjacent ends of booms 10. As indicated, this first buoyancy chamber 12 need not incorporate a downwardly depending entry channel 16 since the inflating medium is introduced into chamber 12 via inflation valve 34. However, the next adjacent chamber 12 would incorporate such an entry channel 16.

Figure 5:
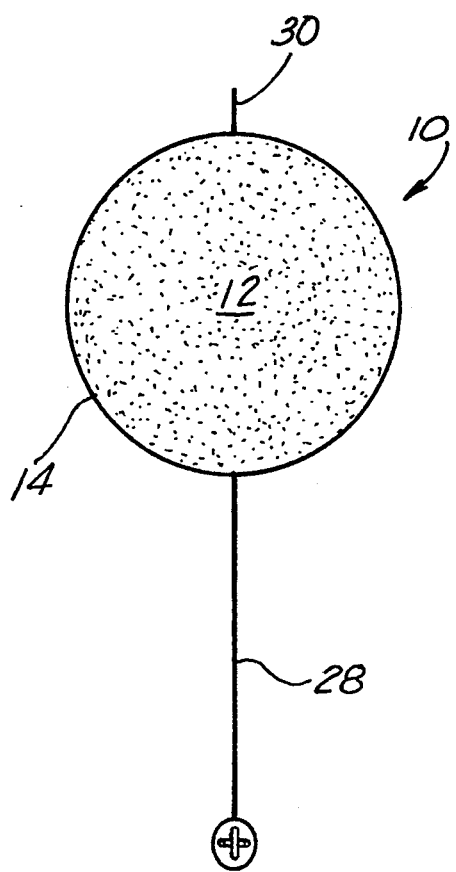
FIG. 5 is a sectional view, taken along LINES 5—5 of FIG. 1, illustrating a mid-region of an inflated chamber.
Figure 6:
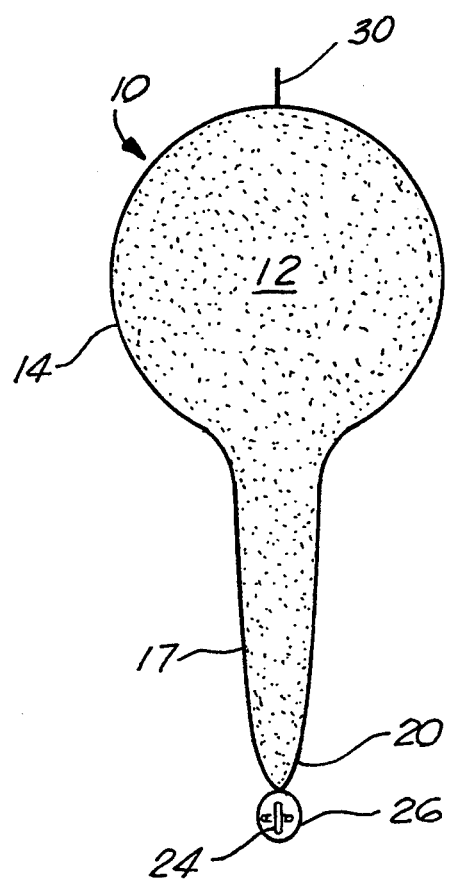
FIG. 6 is a sectional view, taken along LINES 6—6 of FIG. 1 illustrating the interconnecting passageway between adjacent inflated chambers; and, FIG. 7 is a pictorial view, partially broken away, of yet another embodiment of the present invention.

FIGS. 5 and 6 illustrate cross-sectional views through boom 10. FIG. 5 is taken through skirt or panel 28 and illustrates the type of barrier panel 28 provides to the flow of the contained substance through boom 10. FIG. 6, on the other hand, is a cross-sectional view through either of depending channels 16 or 17 and illustrates an end region of buoyancy chamber 12 where passageway 22 would be located.

During operation, boom 10 is unrolled from the deploying vessel and inflated via inflation valve 34 located at one of its ends. This inflation valve 34 provides direct access to the first buoyancy chamber 12 which is to be inflated. Such inflation will continue until the pressure within this first buoyancy chamber 12 becomes sufficient enough to overcome the hydrostatic pressure pressing against the outside of (and thereby closing) its respective depending exit channel 17. Once this closing bias is overcome, the inflating medium will be permitted to pass through passageway 22 and into the corresponding depending entry channel 16 of the next adjacent buoyancy chamber 12. Again, as this second buoyancy chamber 12 becomes pressurized, its exit channel 17 located next to the third buoyancy chamber 12 will become unblocked, thereby permitting the inflating medium to enter this third buoyancy chamber 12. This cycle is repeated until all the buoyancy chambers 12 are inflated to the proper pressure. Any unequal pressure distribution in boom 10 is also eliminated by automatically enabling the inflating medium to move from an area of higher pressure to an area of lower pressure via entry and exit channels 16 and 17 (provided the hydrostatic pressure acting upon channels 16 and 17 can be overcome).

Should a break or tear occur within boom 10, in all likelihood, the inflating medium within the ruptured buoyancy chamber 12 will leak out. However, the hydrostatic pressure acting to close adjacent entry and exit channels 16 and 17 will prevent the inflating medium in adjacent chambers 12 from also leaking out. Thus, depending channels 16 and 17, in conjunction with the hydrostatic pressure acting thereupon, serve as automatic check valves to prevent the loss of inflating medium in the event of a rupture during use. Thus, while perhaps one of the many buoyancy chambers 12 of boom 10 might now be disabled, the function and operation of the entire boom 10 is not lost.

Figure 7:
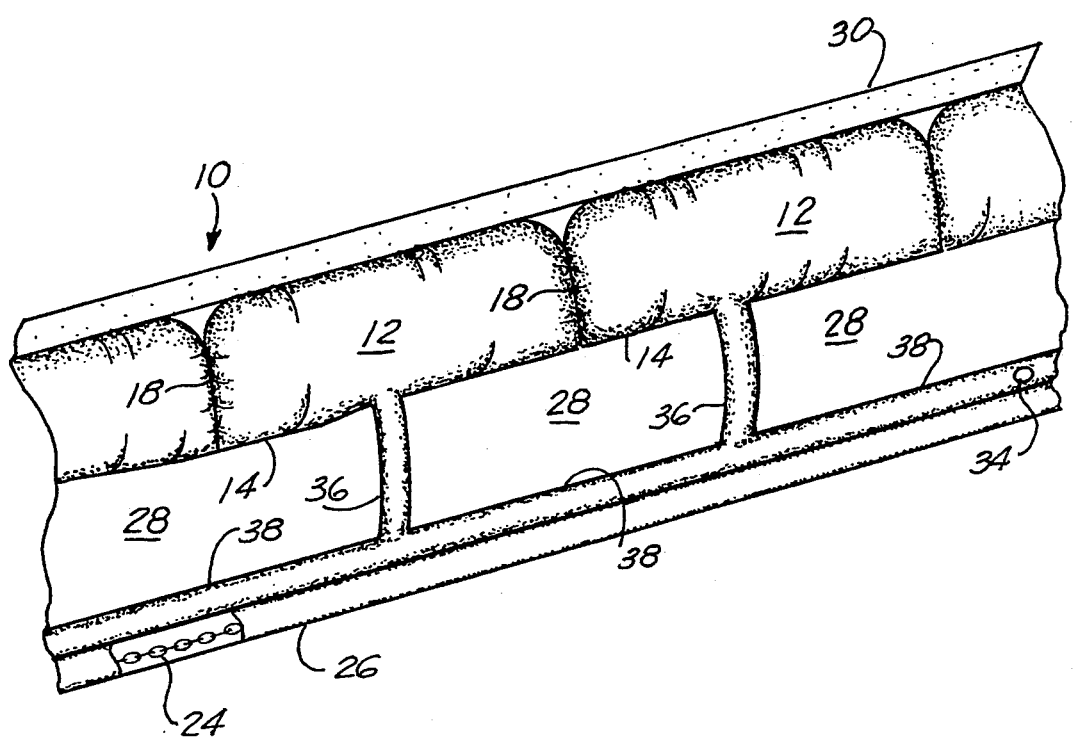

While the embodiments shown illustrate two separate channels 16 and 17 for each intermediate buoyancy chamber 12, it is conceivable as shown in the embodiment of FIG. 7 that each such buoyancy chamber 12 would only incorporate a single conduit or channel 36 depending therefrom. In this alternate configuration, the inflating medium would travel into and out of the buoyancy chamber 12 via single channel 36 rather than the separate channels 16 and 17 as previously shown. Also, tube or passageway 38 positioned intermediate sleeve 26 and panel 28 would connect to each of these depending channels 36 so as to supply the inflating medium to each buoyancy chamber 12. Consequently, passageway 38 would consist of an elongated inflatable medium supply header extending the length of boom 10 rather than simply as an opening between adjacent channels as previously shown. With this configuration, during deployment, elongated passageway 38 would provide a means of delivering the inflating medium to each channel 36 by taking the path of least resistance. Thus, depending upon the pressure within boom 10, the inflating medium would either be delivered to the first buoyancy chamber 12 via its depending channel 36 or the inflating medium would by-pass such channel 36 and be delivered to the next sequential buoyancy chamber 12. Furthermore, after deployment, should one buoyancy chamber 12 rupture, the hydrostatic pressure acting upon all the depending channels 36 would cause these flexible channels 36 to act as an "automatic check valve," thereby closing them once this hydrostatic pressure exceeded the pressure within the channel. This would prevent any further loss of the inflating medium. Also, it is conceivable that ballast 24 would either be located below elongated passageway 38 or ballast 24 could actually extend through passageway 38, whichever is desired.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:
1. A flexible inflatable float boom for confining a material floatable on a liquid surface comprising:
    (a) a plurality of sealed inflatable buoyancy chambers sequentially secured together;
    (b) impervious channel means communicating with and extending downwardly from each of said buoyancy chambers for providing access to each of said buoyancy chamber;
    (c) passageway means for coupling a lower end region of a said channel means of one of said buoyancy chambers with a lower end region of a said channel means of its adjacent said buoyancy chamber, said passageway means and said channel means providing for the passage of a pressurized inflating medium there through into said buoyancy chambers;
    (d) ballast means secured to said float boom underneath said buoyancy chambers for maintaining said boom in a proper orientation when deployed; and,
    (e) means for blocking access to a said buoyancy chamber whenever the internal pressure within its respective said channel means is less than the external hydrostatic pressure acting upon the said channel means.

2. The apparatus as set forth in claim 1, wherein said channel means and said means for blocking access to a said buoyancy chamber comprise a flexible material that is biased to the closed position by external hydrostatic pressure.

3. The apparatus as set forth in claim 2, wherein said channel means are located at the end regions of adjacent said buoyancy chambers, whereby said buoyancy chambers are sequentially inflated and/or deflated.

4. The apparatus as set forth in claim 3, wherein said buoyancy chambers are elongated.

5. The apparatus as set forth in claim 4, wherein said channel means comprise separate entry and exit channels at opposing ends of said chambers.

6. The apparatus as set forth in claim 5, wherein said means for blocking access is located at an elevation above said passageway means.

7. The apparatus as set forth in claim 6, wherein said sequentially secured buoyancy chambers define a first buoyancy chamber, a last buoyancy chamber and intermediate buoyancy chambers therebetween and wherein said first and last buoyancy chambers comprise an inflation valve.

8. The apparatus as set forth in claim 7, further comprising impervious barrier means intermediate said buoyancy chamber and said ballast means for retaining the confined material on one side of the float boom.

9. The apparatus as set forth in claim 8, further comprising a continuous flap secured atop said buoyancy chambers along said boom.

10. The apparatus as set forth in claim 9, wherein said ballast means comprise a continuous weighted material extending through a sleeve secured to the boom.

11. The apparatus as set forth in claim 10, wherein adjacent said float booms may be interconnected together.

12. A method for confining a material floatable on a liquid surface comprising the steps of:
(a) sequentially securing a plurality of sealed inflatable buoyancy chambers together;
(b) providing each said buoyancy chamber with flexible, impervious channel means that communicate with and extend downwardly from its respective said buoyancy chamber for providing access to the said buoyancy chamber;
(c) providing a passageway between a lower end region of a said channel means of one said buoyancy chamber with a lower end region of a said channel means of an adjacent said buoyancy chamber, said passageway and said channel means providing for the passage of an inflating medium therethrough into said buoyancy chambers;
(d) positioning said passageway at an elevation underneath the elevation of said buoyancy chamber;
(e) securing ballast means to said boom underneath said buoyancy chambers for maintaining said boom in a proper orientation when deployed;
(f) supplying a pressurized inflating medium to each of said buoyancy chambers via said channel means and said passageways; and,
(g) blocking access to a said buoyancy chamber whenever the internal pressure within its respective said channel means is less than the external hydrostatic pressure acting upon the said channel means.

13. The method as set forth in claim 12, further comprising the step of positioning said channel means at the end regions of adjacent said buoyancy chambers.

14. The method as set forth in claim 13, further comprising the step of providing said channel means as separate entry and exit channels at opposing ends of said chambers.

15. The method as set forth in claim 14, further comprising the step of providing sealing means for blocking access to said buoyancy chambers at an elevation above said passageway.

16. The method as set forth in claim 15, further comprising the step of sequentially securing said buoyancy chambers together, thereby defining a first buoyancy chamber, a last buoyancy chamber and intermediate buoyancy chambers therebetween and installing an inflation valve in said first and last buoyancy chambers, thereby sequentially supplying the inflating medium to said buoyancy chambers.

17. The method as set forth in claim 16, further comprising the step of providing impervious barrier means intermediate said buoyancy chamber and said ballast means for retaining said confined material on one side of the boom.

18. The method as set forth in claim 17, further comprising the step of providing a continuous flap atop said buoyancy chambers along said boom.

19. The method as set forth in claim 18, further comprising the step of providing said ballast means as a continuous weighted material extending through a sleeve secured to said boom.

20. The method as set forth in claim 19, further comprising the step of interconnecting adjacent float booms together.

21. A float boom for confining material floatable on a liquid surface comprising, in combination:
(a) a first elongated collapsible tube formed of fluid impervious material;
(b) said first tube defining a flat, reelable configuration when collapsed;
(c) means sealingly separating the interior of said first tube into a plurality of adjacent compartments sequentially disposed along the length of said first tube;
(d) a second elongated collapsible tube formed of fluid impervious material and defining a flat reelable configuration when collapsed;
(e) said second tube having a substantially smaller diameter when expanded than said first tube and having a longitudinal edge thereof secured to panel means connected to and depending downwardly from the lower portion of said first tube; and,
(f) a plurality of conduits spaced along the length of said second tube and respectively communicating between the bore of said second tube and said compartments, whereby pressured gas supplied to an end the stored second tube produces successive inflation of said compartments; and,
(g) means for preventing access to said compartments whenever the internal pressure within each compartment's respective said conduit is less than the external pressure acting upon said conduit.

22. The apparatus of claim 21, further comprising a third elongated collapsible tube formed of fluid impervious material;
(a) said third tube defining a flat reelable configuration when collapsed;
(b) means for sealingly securing a longitudinal edge of said third tube to said second tube; and,
(c) a selected quantity of particulate material disposed in each said chamber, said particulate material having a specific gravity substantially greater than that of water.

* * * * *